| United States Patent [19] | [11] 3,846,362 |
|---|---|
| Reinecke et al. | [45] Nov. 5, 1974 |

[54] MOLDING COMPOSITIONS BASED ON ETHYLENE-VINYL ACETATE COPOLYMERS AND PITCH

[75] Inventors: Herbert Reinecke; Klaus Adler; Johann Bauer, all of Burghausen; Reinhard Kretschmer, Munich; Gerhard Lamhofer, Olching; Engelbert Pichler, Burghausen, all of Germany

[73] Assignee: Wacker-Chemie, GmbH, Munich, Germany

[22] Filed: Sept. 7, 1972

[21] Appl. No.: 286,963

[30] Foreign Application Priority Data
Sept. 27, 1971 Germany............................ 2148186

[52] U.S. Cl.................. 260/28.5 AS, 260/28.5 AV, 260/28.5 R, 260/28.5 A, 260/28.5 B, 260/28.5 D
[51] Int. Cl. .......................................... C08f 45/52
[58] Field of Search.............. 260/28.5 AV, 28.5 AS

[56] References Cited
UNITED STATES PATENTS
3,309,329 3/1967 Schultz et al. .............. 260/28.5 AV
3,349,051 10/1967 Alexander.................... 260/28.5 AS
3,635,863 1/1972 Drukker....................... 260/28.5 AS FOREIGN PATENTS OR APPLICATIONS
602,582 5/1948 Great Britain............... 260/28.5 AS Primary Examiner—Allan Lieberman
Assistant Examiner—S. L. Fox
Attorney, Agent, or Firm—Hammond & Littell

[57] ABSTRACT

Molding compositions based on ethylene-vinyl acetate copolymers and pitch comprising a content of A. from 20 percent to 70 percent by weight of a coal tar pitch having a softening point of from 80° to 200°C (DIN 1995)

B. from 10 to 75 percent by weight of an ethylene-vinyl acetate copolymer having a vinyl acetate content of from 30 to 80 percent by weight of the copolymer, and C. from 5 to 50 percent by weight of a thermoplastically shapable polymer having a freezing temperature of below −30°C.

6 Claims, No Drawings

MOLDING COMPOSITIONS BASED ON ETHYLENE-VINYL ACETATE COPOLYMERS AND PITCH

THE PRIOR ART

The production of molding compositions having good mechanical properties by mixing pitch with polymers is known. However, not all polymers are suitable; for example, a composition of polyethylene with pitch results in very brittle products, while from ethylene-propylene-diene rubber and pitch a composition is formed which has no strength.

In DAS 1,231,006, molding compositions consisting of 0.1 to 75 percent by weight of pitch and 25 to 99.9 percent by weight of ethylene-vinylacetate copolymer with a vinyl acetate content between 5 and 50 percent weight are described. Such mixtures have good mechanical properties. If, however, molding compositions which withstand higher thermal stresses are needed, pitch of a high softening point must be used. This, however, leads to molding compositions which are very hard. They have a Shore-A hardness of over 90, and foils made therefrom are stiff at normal temperatures. While such foils show a good thermal stability (e.g., when installed in hot bitumen or under solar radiation) which would make them suitable as roofing strip, it is difficult to install them because of their stiffness.

OBJECTS OF THE INVENTION

An object of the present invention is the obtaining of a molding composition based on ethylene-vinyl acetate copolymers and pitch which has good mechanical properties, and improved low temperature stability and high thermal stability.

Another object of the present invention is the obtaining of a molding composition based on ethylene-vinyl acetate copolymers and pitch consisting essentially of (A) from 20 to 70 percent by weight of a coal tar pitch having a softening point (DIN 1995) of from 80° to 200°C, (B) from 10 to 75 percent by weight of an ethylene-vinyl acetate copolymer having a vinyl acetate content of from 30 to 80 percent by weight of the copolymer, (C) from 5 to 50 percent by weight of a thermoplastically shapable polymer having a freezing temperature of below −30°C, (D) from 0 to 10 percent by weight of additives selected from the group consisting of pigments, fillers, stabilizers and processing aids.

These and other objects of the invention will become more apparent as the description thereof proceeds.

DESCRIPTION OF THE INVENTION

Molding compositions based on ethylene-vinyl acetate copolymers and pitch have now been found. The molding compositions are characterized by a content of- A. from 20 to 70 percent by weight, preferably 40 to 60 percent by weight of coal tar pitch having a softening point of 80° to 200°C, preferably 100° to 195°C (DIN 1995), B. from 10 to 75 percent by weight, preferably 30 to 60 percent by weight of ethylene-vinylacetate copolymer with a vinyl acetate content of 30 to 80 percent by weight, preferably 40 to 70 percent by weight of the copolymer, C. from 5 to 50 percent by weight, preferably 10 to 30 percent by weight of thermoplastically shapable polymers, whose freezing temperature is below −30°C, and possibly fillers, stabilizers as well as processing aids.

More particularly the invention relates to a molding composition based on ethylene-vinyl acetate copolymers and pitch consisting essentially of (A) from 20 to 70 percent by weight of a coal tar pitch having a softening point (DIN 1995) of from 80°to 200°C, (B) from 10 to 75 percent by weight of an ethylene-vinyl acetate copolymer having a vinyl acetate content of from 30 to 80 percent by weight of the copolymer, (C) from 5 to 50 percent by weight of a thermoplastically shapable polymer having a freezing temperature of below −30°C, (D) from 0 to 10 percent by weight of additives selected from the group consisting of pigments, fillers, stabilizers and processing aids.

In addition to their good tearing strength and tensile strength, the molding compositions of the invention have improved low temperature stability. Their cold-break temperature is lower than in pitch-polymer mixtures known until now. At the same time the molding compositions of the invention have also a high thermal stability. Further they show an elastic behavior, in contrast to the known molding compositions, which exhibit a plastic stress-strain characteristic.

The molding compositions are especially suitable for the production of insulating foils such as roofing strips and foils for construction seals. These insulating foils utilize especially the advantageous properties of the molding compositions. Due to the high thermal stability, the foils are installable in hot bitumen and remain hard enough under solar radiation to walk on. On the other hand, the foils are soft enough also at normal temperature and even at cold outside temperatures to insure easy handling. Moreover, the foils are swell-joinable, resistant to weathering (ozone- and light-stable) and have fungicidal properties.

In addition, the molding compositions can be used for example also as sound-proofing materials, ground-water protection coatings, sealing compounds and for the production of shaped bodies.

The molding compositions are produced by mixing the individual components, together while raising the temperature, for example in a mixing mill, a banbury mixer, an internal or screw mixer. The order in which components are added is of no importance. It is however advantageous to premix the polymer components together and to add jointly the remaining ingredients. The temperature in the mixing operation is usually in the melting range of the thermoplastically shapable polymers (Component C).

Commercial products obtain by distillation from coal tar may be used as coal tar pitch (Component A).

The softening temperature of the coal tar pitch, determined according to DIN 1995, should not be below 80°C and not above 200°C and preferably is between 100° to 195°C. Otherwise, the mechanical values of the mixtures will be impaired.

Component B consists of copolymers of ethylene with vinyl acetate, the content of the vinyl acetate being from 30 to 80 percent by weight, preferably from 40 to 70 percent by weight. These polymers are produced by known processes, often by free-radical emulsion polymerizations, e.g., according to German Pat. No. 1,133,130 or U.S. Pat. No. 3,563,963, for example the VAE type copolymers of Wacker-Chemie GmbH. The quantities used are variable within wide limits.

As thermoplastically shapable polymers, there enter into consideration both elastomers, such as natural rubber, synthetic rubber, for example ethylene-propylene rubber, ethylene-propylene-diene rubber, acrylonitrile rubber, butadiene-styrene rubber, acrylonitrile-butadiene-styrene rubber, isoprene rubber, chloroprene rubber, and ethylene-vinylchloride rubber, or thermoplasts, such as polyethylene, polyvinyl chloride, plasticized polyvinyl chloride, polyvinyl chloride plastisols, polystyrene, or their mixtures. Preferably polyethylene or so-called thermoplastic rubbers based on butadiene-styrene or polyurethane are used. The addition of Component C brings about improvements already in quantities of 5 percent by weight; usually quantities of 10 to 30 percent by weight are used.

Stabilizers, fillers, pigments and processing aids may be added to the molding compositions of the invention in quantities up to 50 percent by weight collectively or individually.

Examples of stabiliziers are polycarbodiamides, vinylnaphthalene, lead compounds and alkylated phenols. Examples of fillers are carbon black, chalk, kaolin, quartz powder, kieselguhr, talc and heavy spar. Examples of pigments are the conventional pigments for plastics such as zinc oxide. Examples of processing aids are waxes, factices, coumarone resins, plasticizer esters, and stearic acid.

The following examples are illustrative of the invention without being limitative in any manner.

EXAMPLE 1

Mixtures were prepared from the following components as given in the Table by mixing first the polymer components on a mixing mill at 160°C and adding the remaining components to the mixing mill. After sheeting out, the properties of the mixtures were ascertained and likewise reported in the Table.

| 1) VAE 611 | Ethylene-vinyl acetate copolymer of Wacker-Chemie GmbH with 60% vinyl acetate and a melt index $i_5$ = 0.25 |
| --- | --- |
| 2) "Dutral" TER 048/E | Ethylene-propylene-butadiene terpolymer of Montecatini, Mooney viscosity ML-4, 69 |
| 3) "Baypren" 230 | Polychloroprene rubber of Bayer, Mooney viscosity ML-4, 95–110 |
| 4) "Perbunan" N 2810 | Butadiene-acrylonitrile rubber of Bayer, 28% acrylonitrile, Mooney viscosity ML-4, 65 ± 7 |
| 5) H 70 F Stabilized | Suspension polymerized polyvinyl chloride of Wacker-Chemie GmbH, K value 70, stabilized with 2 parts of lead phthalate and 2 parts of lead stearate 51% |
| 6) Plastisol H 70 F | Polyvinyl chloride H 70 F of Wacker-Chemie GmbH plus 50 parts of dibutyl phthalate |
| 7) "Hypalon" 20 | Crosslinked Chlorosulfonated polyethylene of Du Pont, Mooney viscisity ML-4, 30 |
| 8) "Epikote" 828 | Epoxy resin from epichlorohydrin and diphenylolpropane of Shell (crosslinked) |
| 9) "Ultramoll" PU | Polyurethane plasticizer of Bayer |
| 10) "Cariflex" TR 4122 | Thermoplastic rubber, block polymerizate from butadiene-styrene of Shell, melt index at 5 kg load and 200°C, 22 g/10 min. |
| 11) "Desmopan" 485 | Thermoplastic polyurethane rubber of Bayer. |
| 12) "Hycar" 1072 | Acrylonitrile-butadiene rubber of Goodrich, containing about 31% by weight acrylonitrile, 5% by weight acrylic and methacrylic acid, Mooney viscosity ML-4, 35–60 |
| 13) Low-pressure polyethylene of Wacker-Chemie, GmbH, density 0.947 | |

EXAMPLE 2

On a drum a homogeneous mixture was produced at 150°C from coal tar pitch, ethylene-vinyl acetate copolymer and polyethylene. For comparison also a mixture without polyethylene was prepared.

TABLE

| Ingredients | | 1 | 2 | 3 | 4 | 5 | 6 | 7 | 8 | 9 | 10 | 11 |
| --- | --- | --- | --- | --- | --- | --- | --- | --- | --- | --- | --- | --- |
| 1) VAE 611 | 1) | 100 | 80 | 80 | 80 | 100 | 80 | 80 | 80 | 75 | 80 | 80 |
| Coal Tar Pitch, Softening Point 160°C | | 100 | 100 | 100 | 100 | 100 | 100 | 100 | 100 | 100 | 100 | 100 |
| 2) "Dutral" TER | 2) | — | 20 | — | — | — | — | — | — | — | — | — |
| 3) "Baypren" 230 | 3) | — | — | 20 | — | — | — | — | — | — | — | — |
| 4) "Perbunan" N 2810 | 4) | — | — | — | 20 | — | — | — | — | — | — | — |
| 5) H 70 F Stabilized | 5) | — | — | — | — | — | 10 | — | — | — | — | — |
| 6) Plastisol H 70 F | 6) | — | — | — | — | 20 | — | — | — | — | — | — |
| 7) "Hypalon" 20 | 7) | — | — | — | — | — | — | 20 | — | — | — | — |
| 8) "Epikote" 828 | 8) | — | — | — | — | — | — | — | 5 | — | — | — |
| 9) "Ultramoll" PU | 9) | — | — | — | — | — | 10 | — | — | — | — | — |
| 10) "Cariflex" TR 4122 | 10) | — | — | — | — | — | — | — | 20 | — | — | 20 |
| 11) "Desmopan" 485 | 11) | — | — | — | — | — | — | — | — | 25 | — | — |
| 12) "Hycar" 1072 | 12) | — | — | — | — | — | — | — | — | — | 20 | — |
| 13) LP-polyethylene, density 0.947 | 13) | — | — | — | — | — | — | — | — | — | — | 10 |
| Zinc oxide | | 3 | — | 3 | 3 | — | — | 3 | — | — | 3 | — |
| Stearic Acid | | 0.5 | 0.5 | 0.5 | 0.5 | 0.5 | 1 | 1 | 0.5 | 1 | 1 | 0.5 |
| Tearing Strength kp/cm² | | 55 | 35 | 60 | 49 | 45 | 51 | 42 | 46 | 62 | 51 | 40 |
| Tearing Elongation % | | 390 | 360 | 470 | 575 | 270 | 170 | 180 | 480 | 340 | 430 | 265 |
| Resistance to continued Tearing kp/cm | | 25 | 20 | 34 | 26 | 20 | 25 | 21 | 21 | 33 | 29 | 27 |
| Shore A hardness | | | | | | | | | | | | |
| 23° | | 73 | 75 | 80 | 77 | 75 | 84 | 76 | 80 | 96 | 80 | 82 |
| 60° | | 30 | 39 | 47 | 38 | 34 | 56 | 44 | 44 | 59 | 50 | 54 |
| 80° | | <20 | <20 | <20 | <20 | <20 | 28 | 24 | <20 | 43 | 21 | 31 |
| Cold Impact Resistance °C (according to Williams, 1Cl) | | −5 | −15 | −10 | −10 | −10 | −10 | −10 | −15 | −10 | −10 | −15 |

In the above Table, the constituents of the trade-named items and manufacture are as follows:

| | | |
|---|---|---|
| VAE 611 (1) | 100 | 100 |
| Low-pressure polyethylene Density 0.947 | 20 | — |
| Coal tar pitch, Softening Point 160°C | 100 | 100 |
| Shore A hardness | | |
| 23° | 83 | 62 |
| 40° | 71 | 45 |
| 60° | 43 | 23 |

It can be noted that the Shore-A hardness of the mixture with polyethylene are substantially better at all temperatures.

Also the cold stability was good. A foil 1 mm thick of the above-described composition with polyethylene could be bent at −10° around a mandrel of 20 mm diameter within 3 sec without cold-break occurring.

As a further advantage it is found that due to Component C the heat shrinkage decreases. A foil which consisted only of VAE and pitch and was prepared on a test calender had a shrinkage of 6 percent at 80°C. After addition of 20 percent by weight of polyethylene the shrinkage dropped to 0.5 percent at 80°C under the same calender conditions.

The preceeding specific embodiments are illustrative of the practice of the invention. It is to be understood however that other expedients known to those skilled in the art or disclosed herein may be employed without departing from the spirit of the invention or the scope of the appended claims.

We claim:

1. A molding composition for the preparation of foils based on ethylene-vinyl acetate copolymers and pitch consisting essentially of (A) from 40 to 60 percent by weight of a coal tar pitch having a softening point (DIN 1995) of from 100°C to 195°C, (B) from 30 to 60 percent by weight of an ethylene-vinyl acetate copolymer having a vinyl acetate content of from 50 to 70 percent by weight of the copolymer, (C) from 10 to 30 percent by weight of a thermoplastically shapable polymer having a freezing temperature of below −30°C, (D) from 0 to 10 percent by weight of additives selected from the group consisting of pigments, fillers, stabilizers and processing aids.

2. The molding composition of claim 1 wherein component C is a thermoplast.

3. The molding composition of claim 2 wherein said thermoplast is polyethylene.

4. The molding composition of claim 1 wherein component C is an elastomer.

5. The molding composition of claim 4 wherein said elastomer is a synthetic thermoplastic rubber.

6. The molding composition of claim 5 wherein said synthetic thermoplastic rubber is selected from the group consisting of styrene-butadiene thermoplastic rubbers and polyurethane thermoplastic rubbers.

* * * * *